United States Patent
Lai et al.

(10) Patent No.: US 10,324,693 B2
(45) Date of Patent: Jun. 18, 2019

(54) OPTIMIZING MULTIPLE INVOCATIONS OF GRAPHICS PROCESSING UNIT PROGRAMS IN JAVA

(71) Applicant: Nvidia Corporation, Santa Clara, CA (US)

(72) Inventors: Michael Lai, Santa Clara, CA (US); Vinod Grover, Santa Clara, CA (US); Sean Lee, Redmond, WA (US); Jaydeep Marathe, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 179 days.

(21) Appl. No.: 14/950,134

(22) Filed: Nov. 24, 2015

(65) Prior Publication Data
US 2017/0147299 A1    May 25, 2017

(51) Int. Cl.
| | | |
|---|---|---|
| *G06F 8/41* | (2018.01) | |
| *G06F 8/30* | (2018.01) | |
| *G06F 9/455* | (2018.01) | |
| *G06F 9/50* | (2006.01) | |
| *G06F 9/445* | (2018.01) | |

(52) U.S. Cl.
CPC ............... *G06F 8/41* (2013.01); *G06F 8/315* (2013.01); *G06F 9/45525* (2013.01); *G06F 9/50* (2013.01); *G06F 8/443* (2013.01); *G06F 9/445* (2013.01)

(58) Field of Classification Search
CPC ..... G06F 8/45; G06F 8/47; G06F 8/52; G06F 8/443; G06F 9/45516; G06F 9/45504; G06F 8/456; G06F 9/5066; G06F 8/41; G06F 9/45525; G06F 9/50; G06F 8/315; G06F 9/445
See application file for complete search history.

(56) References Cited

U.S. PATENT DOCUMENTS

| | | | | |
|---|---|---|---|---|
| 6,804,682 B1* | 10/2004 | Kemper | .................... | G06F 8/72 |
| 8,134,561 B2* | 3/2012 | Harper | ..................... | G06T 1/20 |
| | | | | 345/501 |

(Continued)

OTHER PUBLICATIONS

Ishizaki et al., "Compiling and Optimizing Java 8 Programs for GPU Execution", Oct. 18, 2015, IEEE, PACT'15, pp. 419-431; <http://ieeexplore.ieee.org/stamp/stamp.jsp?tp=&arnumber=7429325>.*

(Continued)

*Primary Examiner* — Benjamin C Wu
(74) *Attorney, Agent, or Firm* — Eric Metzger; Parker Justiss, P.C.

(57) ABSTRACT

A system and method for optimizing multiple invocations of a graphics processing unit (GPU) program in Java. In one embodiment, the system includes: (1) a frontend component in a computer system and configured to compile Java bytecode associated with the a class object that implements a functional interface into Intermediate Representation (IR) code and store the IR code with the associated jogArray and (2) a collector/composer component in the computer system, associated with the frontend and configured to traverse a tree containing the multiple invocations from the result to collect the IR code and compose the IR code collected in the traversing into aggregate IR code when a result of the GPU program is explicitly requested to be transferred to a host.

20 Claims, 4 Drawing Sheets

(56) References Cited

U.S. PATENT DOCUMENTS

| | | | | |
|---|---|---|---|---|
| 8,570,333 | B2* | 10/2013 | Yu | G06F 8/45 345/501 |
| 9,632,761 | B2* | 4/2017 | Pechanec | G06F 8/451 |
| 9,798,569 | B2* | 10/2017 | Lai | G06F 9/45558 |
| 10,229,096 | B1* | 3/2019 | Bienkowski | G06F 8/40 |
| 2002/0095667 | A1* | 7/2002 | Archambault | G06F 8/443 717/154 |
| 2005/0231514 | A1* | 10/2005 | Harper | G06T 1/20 345/501 |
| 2006/0136867 | A1* | 6/2006 | Schneider | G06F 21/14 717/106 |
| 2006/0253508 | A1* | 11/2006 | Colton | G06F 8/52 |
| 2007/0162903 | A1* | 7/2007 | Babb, II | G06F 8/75 717/154 |
| 2013/0347009 | A1* | 12/2013 | Hall | G06F 9/4423 719/328 |
| 2014/0019948 | A1* | 1/2014 | Goetz | G06F 8/437 717/143 |
| 2014/0096115 | A1* | 4/2014 | Guan | G06F 8/41 717/140 |
| 2014/0347375 | A1* | 11/2014 | Stenson | G06T 1/20 345/522 |
| 2015/0199787 | A1* | 7/2015 | Pechanec | G06F 9/5044 345/522 |
| 2015/0221059 | A1* | 8/2015 | Baker | G06T 1/20 345/522 |
| 2015/0331700 | A1* | 11/2015 | Grover | G06F 9/45516 717/143 |
| 2015/0347107 | A1* | 12/2015 | Munshi | G06F 8/47 717/147 |

OTHER PUBLICATIONS

Fumero et al., "A Composable Array Function Interface for Heterogeneous Computing in Java", Jun. 9, 2014, ACM, Array'14, Edinburgh, United Kingdom, pp. 44-49; <http://dl.acm.org/citation.cfm?id=2627381&CFID=761601880&CFTOKEN=98351079>.*

Lambda Translation, "Translation of Lambda Expressions", Internet Publication, pp. 1-10; <http://cr.openjdk.java.net/~briangoetz/lambda/lambda-translation.html>.*

Marek's Totally Not Insane Idea of the Day, "IR Is Better Than Assembly—Idea of the day", https://idea.popcount.org/2013-07-24-ir-is-better-than-assembly/, dated Jul. 24, 2013, 8 pages.

Wikipedia, "LLVM", https://en.wikipedia.org/wiki/LLVM, dated Oct. 8, 2015, 7 pages.

LLVM Language Reference Manual—LLVM 3.8 Documentation, LLVM Compiler Infrastructure, http://llvm.org/docs/LangRef.html, Oct. 8, 2015, 180 pages.

Lattner, Chris, "LLVM, The Architecture of Open Source Applications—Elegance, Evolution, and a Few Fearless Hacks", http://www.aosabook.org/en/llvm.html, Oct. 8, 2015, 13 pages.

* cited by examiner

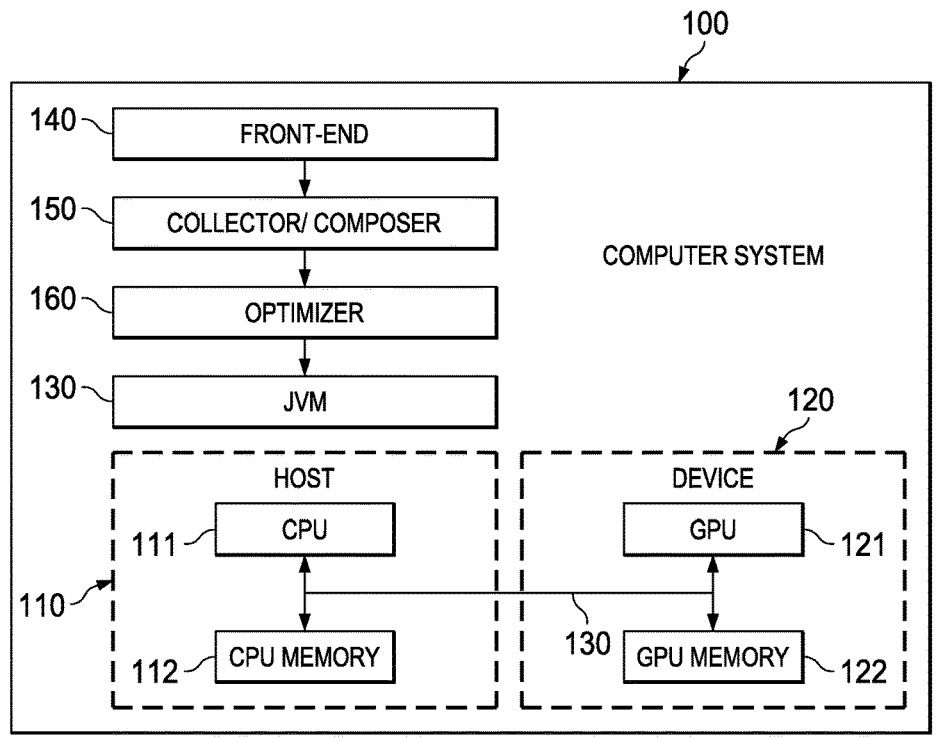
FIG. 1
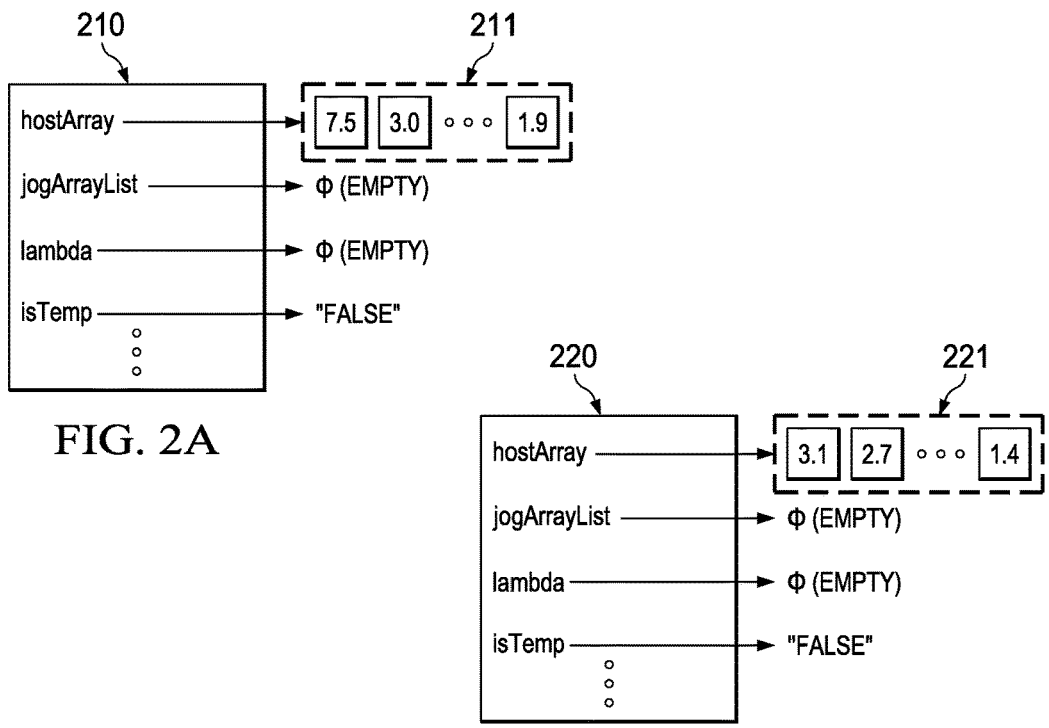
FIG. 2A
FIG. 2B

OPTIMIZING MULTIPLE INVOCATIONS OF GRAPHICS PROCESSING UNIT PROGRAMS IN JAVA

TECHNICAL FIELD

This application is directed, in general, to parallel processing units and, more specifically, to a system and method for optimizing multiple invocations of graphics processing unit (GPU) programs in Java.

BACKGROUND

Over its more-than-20 year history, software developers have written scores of applications in the Java object-oriented programming language. (A major implementation of Java is commercially available from Oracle Corporation of Redwood City, Calif.) Java was developed with a "write once, run anywhere" philosophy, meaning that its primary advantage is cross-platform compatibility. Accordingly, Java is designed to execute on a virtual machine, a Java Virtual Machine, or "JVM," to be exact. While various central processing units (CPUs) host JVM implementations written specifically for them, the JVMs themselves are designed to present the same virtual computing environment to applications written in Java ("Javacode"). Java bytecode is called "bytecode."

Nvidia Corporation of Santa Clara, Calif., has developed a Java library, called "Java on GPU," or JoG. JoG introduces new Java classes that allow developers to accelerate the execution of Java applications on computer systems having a GPU in addition to the CPU that hosts the JVM. The GPU serves as a device relative to the host CPU. Software development tools that incorporate JoG allow automatic GPU acceleration of Java bytecode without too much special effort on the developer's part: after the JoG library is incorporated, the developer only needs to make minor changes to the Java source code to enable the automatic GPU acceleration. JoG and the tools designed to incorporate it bring to Java the remarkable processing power GPUs can provide, assuming their power is properly used.

One JoG construct is a "jog.foreach ( )" statement, which creates a jogArray object that contains necessary information and data to compile a specified class object that implements a functional interface (e.g., a lambda function) into a GPU program (which may include one or more GPU device functions). JoG source code in Table 1, below, provides an example in which lambda_mul and lambda_add are Java lambda functions that are compiled into Compute Unified Device Architecture (CUDA) programs for a GPU commercially available from Nvidia Corporation:

TABLE 1

JoG Source Code Example

```
jC = jog.foreach(jA, jB, lambda_mul); // statement 1
jE = jog.foreach(jC, jD, lambda_add); // statement 2
jE.toHost( ); // statement 3
```

The syntax of the jog.foreach ( ) construct is as follows:

jB=jog.foreach(jA1,jA2, . . . ,jAn,lambda), where jB is a result jogArray, jA1, jA2, . . . , jAn are input jogArrays, and lambda is a class object that implements a functional interface and accepts formal arguments and captured variables as needed.

Given this syntax, the JoG source code example of Table 1 will now be explained. Statement 1 multiplies each element of jogArray jA with the corresponding element of jogArray jB and stores the product in the corresponding element of jogArray jC. (A jogArray is an array that is the subject of a GPU program.) Statement 2 then adds each element of the (newly computed) jogArray jC to the corresponding element of jogArray jD and stores the sum in the corresponding element of jogArray jE. Each jog.foreach( ) call is an invocation of a GPU program. JoG manages all data transfers between the host and the device (in both directions) as well as launching of the programs (derived from lambda_mul and lambda_add).

SUMMARY

One aspect provides a system for optimizing multiple invocations of a GPU program in Java. In one embodiment, the system includes: (1) a frontend component in a computer system and configured to compile Java bytecode associated with a class object that implements a functional interface into Intermediate Representation (IR) code and store the IR code with the associated jogArray and (2) a collector/composer component in the computer system, associated with the frontend and configured to traverse a tree containing the multiple invocations from the result to collect the IR code and compose the IR code collected in the traversing into aggregate IR code and generate GPU executable code when a result of the GPU program is explicitly requested to be transferred to a host.

Another aspect provides a method of optimizing multiple invocations of a GPU program in Java. In one embodiment, the method includes: (1) compiling Java bytecode associated with a class object that implements a functional interface into IR code, (2) storing the IR code with the associated jogArray, (3) when a result of the GPU program is explicitly requested to be transferred to a host, traversing a tree containing the multiple invocations from the result to collect the IR code and (4) composing the IR code collected in the traversing into aggregate IR code.

BRIEF DESCRIPTION

Reference is now made to the following descriptions taken in conjunction with the accompanying drawings, in which:

FIG. 1 is a block diagram of a computer system within which embodiments of the system and method disclosed herein may operate;

FIGS. 2A-2E are diagrams illustrating an example of jog.Arrays extended to accommodate IRs and status flags for use by the system and method disclosed herein.

DETAILED DESCRIPTION

Figure 2C:
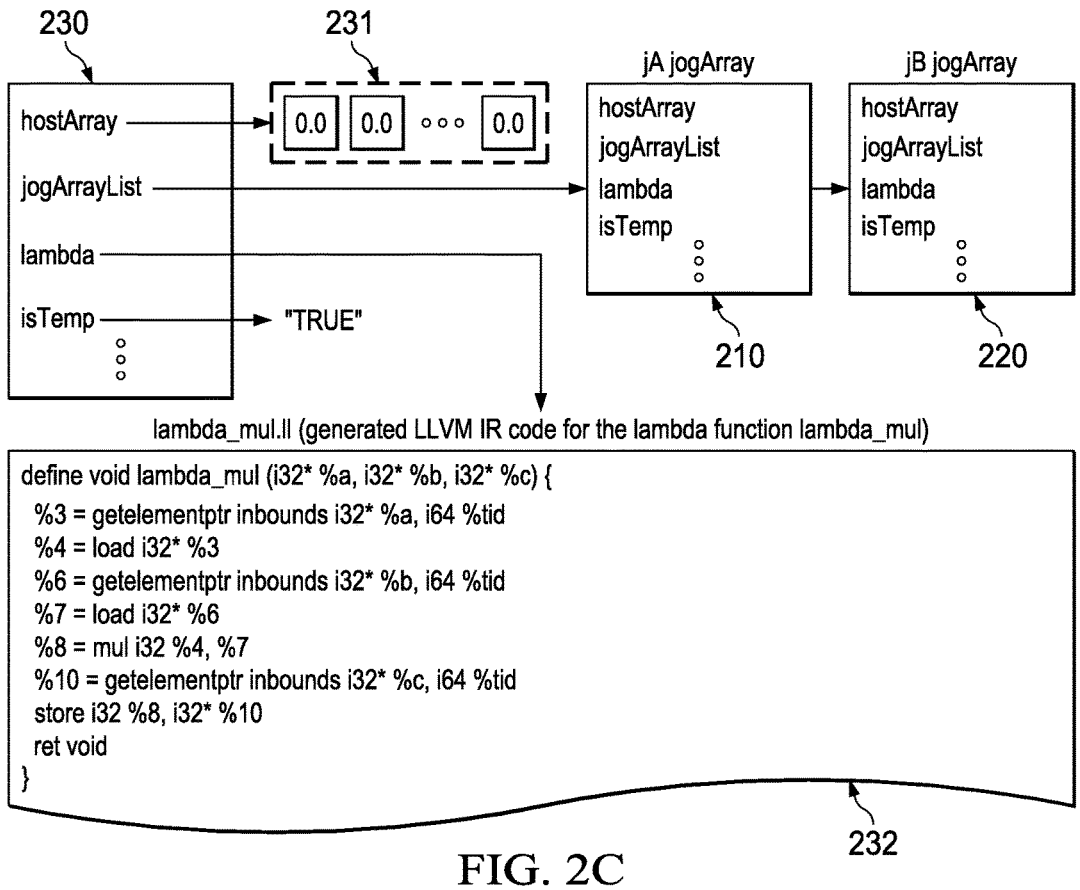

As stated above, JoG manages all the data transfers between the host and the device (in both directions) as well as the launching of the programs. Conventionally, JoG would launch a program for each jog.foreach( ) call. This is "eager evaluation" (an evaluation strategy according to which an expression is evaluated as soon as it is bound to a variable) and is the method conventional programming languages greatly favor. However, it is realized herein that eager evaluation may result in inefficient GPU utilization.

More specifically, it is realized herein that eager evaluation may cause the GPU to compute results that are ultimately discarded, which wastes valuable computing resources.

It is realized herein that effective GPU bandwidth may be increased by relieving the GPU from having to compute unnecessary results. Introduced herein are various embodiments of systems and methods for optimizing multiple invocations of GPU programs. The various embodiments involve "lazy evaluation" (an evaluation strategy according to which the evaluation of an expression is delayed until its value is needed and repeated evaluations are avoided). Also introduced herein is a novel jogArray structure extension that accommodates the lazy evaluation.

FIG. 1 is a block diagram of a computer system 100 within which embodiments of the system and method disclosed herein may operate. The computer system 100 has a host 110 that includes a CPU 111 and associated CPU memory 112. The computer system also has a device 120 that includes a GPU 121 and associated GPU memory 122. A bus 130 couples the CPU 111, CPU memory 112, GPU 121 and GPU memory 122 together. It will be apparent to those skilled in the pertinent art that the illustrated computer system 100 is rudimentary. For example, most computer systems have a more complex bus than the bus 130. Indeed, most computer systems have multiple buses and bus levels for interconnecting their CPUs, GPUs and associated memory.

The hardware of the computer system 100 is illustrated conceptually. This is done in part to indicate the relationship between the host 110 and the device 120 and to show that, in the computer system 100 embodiment, data on which the CPU 111 operates is stored in the CPU memory 112, and data on which the GPU 121 operates is stored in the GPU memory 122. Accordingly, data may need to be moved between the CPU memory 112 and the GPU memory 122 as necessary to allow appropriate processing.

As stated above, the system and method introduced herein defers launching of GPU programs until a result is requested (e.g., by JoG's jE.toHost( ) statement) and then launches possibly fewer than all GPU programs than would have otherwise been launched in an eager evaluation. Certain embodiments of the system and method back-analyze the path taken to achieve the result, prune unnecessary GPU program invocations and launch only GPU programs that actually participate in the outcome of the result. Accordingly, FIG. 1 illustrates a JVM 130 supported by (executing on) the host 110. As will be described in greater detail below, a frontend 140 is configured to receive Java bytecode and produce IR code. One specific embodiment of IR code, which will be illustrated herein, is LLVM ("Low-Level Virtual Machine") IR code. Those skilled in the pertinent art are familiar with other embodiments of IR code.

A collector/composer 150 is configured to collect the IR code selectively based on what is necessary to produce a requested result (which may involve collecting all, some or none of the IR code) and compose, from what is collected, aggregate IR code. An optimizer 160 then optimizes the IR code into optimized equivalent IR code, from which GPU executable code is generated and passed to the GPU for execution.

FIGS. 2A-2E are diagrams illustrating an example of jog.Arrays extended to accommodate IRs, specifically LLVM IRs, and status flags for use by the system and method disclosed herein. The example of FIGS. 2A-2E corresponds with the JoG bytecode example of Table 1, above.

FIG. 2A illustrates jog.Array jA 210. Jog.Array jA 210 includes a hostArray field that contains an array A 211 (or a handle to the array A 211) whose elements are input to the Java lambda function lambda_mul. (Those skilled in the pertinent art understand that a Java lambda function is one embodiment of a class object that implements a functional interface.) In the example of FIGS. 2A-2E, the data in the array A 211 was moved from the CPU memory 112 of FIG. 1 to the GPU memory 122 of FIG. 1. Jog.Array jA 210 is extended with a jogArrayList field, which includes any jogArrays that participate in the outcome of the array A 211. In the example of FIGS. 2A-2E, the jogArrayList field is empty, as FIG. 2A shows, signifying that no jogArrays participate in the outcome of the array A 211. Jog.Array jA 210 is further extended with a lambda field that includes any IR code generated from any Java lambda function associated with jog.Array jA. Because no Java lambda functions participate in the outcome of the array A 211, no IR code is associated with jog.Array jA 210, and the lambda field is empty. Jog.Array jA 210 is yet further extended with a Boolean isTemp field to convey in subsequent processing whether or not a particular jog.Array is used as a temporary array, so loads from and stores into it can be safely optimized away as appropriate. As is apparent in FIG. 2A, the isTemp field for jog.Array jA 210 is set to "false," indicating that jog.Array jA 210 is not temporary.

FIG. 2B illustrates jog.Array jB 220. Like jog.Array jA 210, Jog.Array jB 220 includes a hostArray field that contains an array B 221 (or a handle to the array B 221) whose elements are input to the Java lambda function lambda_mul. Like jog.Array jA 210, the data in the array B 221 was moved from the CPU memory 112 of FIG. 1 to the GPU memory 122 of FIG. 1. Like Jog.Array jA 210, Jog.Array jB 220 is extended with a jogArrayList field. Like jog.Array jA 210, the jogArrayList field is empty, signifying that no jogArrays participate in the outcome of the array B 221. Like jog.Array jA 210, jog.Array jB 220 is further extended with a lambda field. Like jog.Array jA 210, the lambda field is empty, because no Java lambda functions participate in the outcome of the array B 221, and no IR code is associated with jog.Array jB 220. Like jog.Array jA 210, jog.Array jB 220 is yet further extended with an isTemp field that is set to "false," because no IR code is associated with jog.Array jB 220.

FIG. 2C illustrates jog.Array jC 230. Like jog.Array jA 210 and jog.Array JB 220, jog.Array jC 230 includes a hostArray field that contains an array C 231 (or a handle to the array C 231). However, the array C 231 is the result of a multiplication of the array A 211 and the array B 221. Therefore, the elements of the array C 231 are initially all zero, which required no move from the CPU memory 112 of FIG. 1 to the GPU memory 122 of FIG. 1. Like jog.Array jA 210 and jog.Array jB 220, jog.Array jC 230 is extended with a jogArrayList field. However, since the array C 231 is the result of a lambda_mul function, the jogArrayList field contains both jogArray jA 210 and jogArray jB 220, which participate in the multiplication. Like jog.Array jA 210 and jog.Array jB 220, jog.Array jC 230 is further extended with a lambda field. However, the lambda field is not empty, because IR code is generated for the lambda_mul function. In the example of FIGS. 2A-2E, the example LLVM IR code of Table 2, below, is associated with the lambda_mul function. (Those skilled in the pertinent art will understand that the IR code generated may differ significantly from that set forth in Table 2.)

TABLE 2

LLVM IR code Associated With Lambda_mul

```
define void lambda_mul(i32* %a, i32* %b, i32* %c) {
    %3 = getelementptr inbounds i32* %a, i64 %tid
    %4 = load i32* %3
    %6 = getelementptr inbounds i32* %b, i64 %tid
    %7 = load i32* %6
    %8 = mul i32 %4, %7
    %10 = getelementptr inbounds i32* %c, i64 %tid
    store i32 %8, i32* %10
    ret void
}
```

Like jog.Array jA 210 and jog.Array jB 220, jog.Array jC 230 is yet further extended with an isTemp field. In the case of jog.Array jC 230, the isTemp field is set to "true," because IR code is associated with jog.Array jC 230.

Figure 2D:
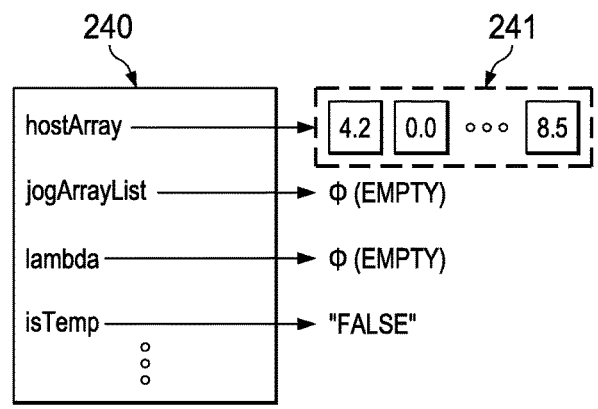

FIG. 2D illustrates jog.Array jD 240. Like jog.Arrays jA-jC 210-230, jog.Array jD 240 includes a hostArray field that contains an array D 241 (or a handle to the array D 241) whose elements are to be added to the corresponding elements of array C 231 in a lambda_add function. Like jog.Array jA 210 and jog.Array jB 220, the data in the array D 241 was moved from the CPU memory 112 of FIG. 1 to the GPU memory 122 of FIG. 1. Like jog.Arrays jA-jC 210-230, jog.Array jD 240 is extended with a jogArrayList field. Like jog.Array jA 210 and jog.Array jB 220, the jogArrayList field is empty, signifying that no jogArrays participate in the outcome of the array D 241. Like jog.Arrays jA-jC 210-230, jog.Array jD 240 is further extended with a lambda field. Like jog.Array jA 210 and jog.Array jB 220, the lambda field is empty, because no Java lambda functions participate in the outcome of the array D 241, and no IR code is associated with jog.Array jD 240. Like jog.Arrays jA-jC 210-230, jog.Array jD 240 is yet further extended with an isTemp field that is set to "false," because no IR code is associated with jog.Array jD 240.

Figure 2E:
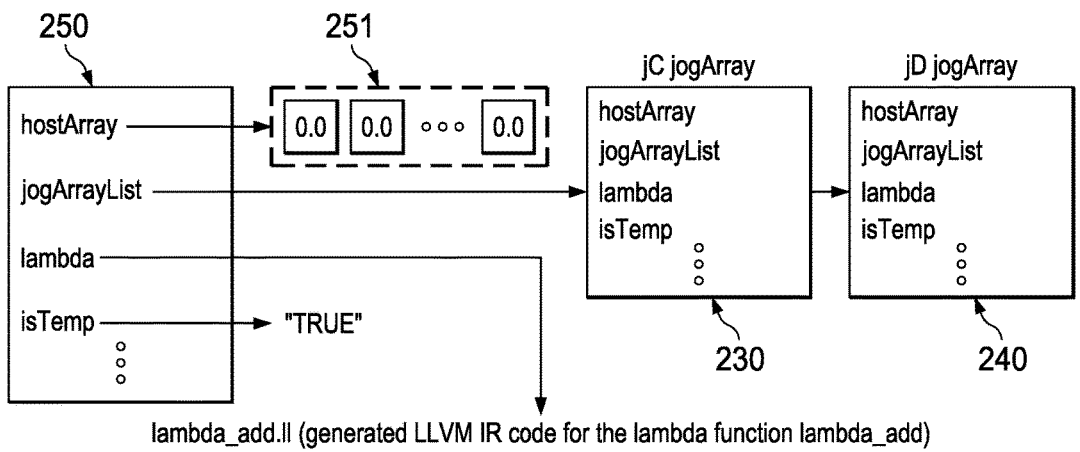

FIG. 2E illustrates jog.Array jE 250. Like jog.Arrays jA-jD 210-240, jog.Array jE 250 includes a hostArray field that contains an array E 251 (or a handle to the array E 251). Like the array C 231, which was the result of a multiplication of the array A 211 and the array B 221, the array E 251 is the result of an addition of the array C 231 and the array D 241. Therefore, the elements of the array E 251 are initially all zero, which required no move from the CPU memory 112 of FIG. 1 to the GPU memory 122 of FIG. 1. Like jog.Arrays jA-jD 210-240, jog.Array jE 250 is extended with a jogArrayList field. However, since the array E 251 is the result of a lambda_add function, the jogArrayList field contains both jogArray jC 230 and jogArray jD 240, which participate in the addition. Like jog.Arrays jA-jD 210-240, jog.Array jE 250 is further extended with a lambda field. However, the lambda field is not empty, because IR code is generated from the lambda_add function. In the example of FIGS. 2A-2E, the LLVM IR code of Table 3, below, is associated with the lambda_add operation. (Those skilled in the pertinent art will understand that the IR code generated may differ significantly from that set forth in Table 3.)

TABLE 3

LLVM IR code Associated With Lambda_add

```
define void lambda_add(i32* %a, i32* %b, i32* %c) {
    %3 = getelementptr inbounds i32* %a, i64 %tid
    %4 = load i32* %3
```

TABLE 3-continued

LLVM IR code Associated With Lambda_add

```
    %6 = getelementptr inbounds i32* %b, i64 %tid
    %7 = load i32* %6
    %8 = add i32 %4, %7
    %10 = getelementptr inbounds i32* %c, i64 %tid
    store i32 %8, i32* %10
    ret void
}
```

Like jog.Arrays jA-jD 210-240, jog.Array jE 250 is yet further extended with an isTemp field. In the case of jog.Array jE 250, the isTemp field is set to "true," because IR code is associated with jog.Array jE 250.

Figure 3:
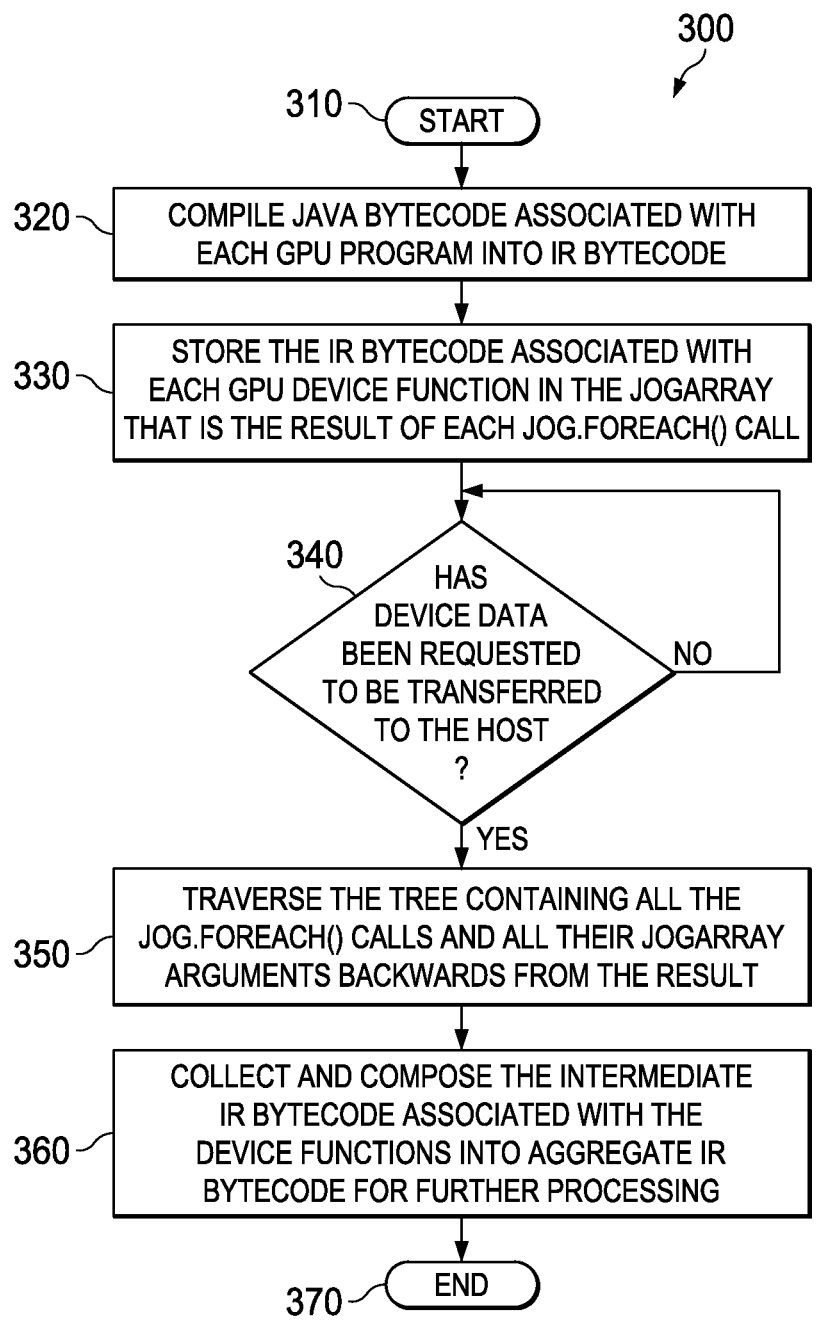
FIG. 3 is a flow diagram of one embodiment of a method of optimizing multiple invocations of GPU programs in Java.

FIG. 3 is a flow diagram of one embodiment of a method 300 of optimizing multiple invocations of GPU programs in Java. The method 300 begins in a start step 310, when jog.Arrays are created for each of the arrays employed in the GPU programs to be invoked. In a step 320, Java bytecode associated with each Java lambda function (the Java lambda function specified in the jog.foreach( ) call) is compiled into IR code. In a step 330, the IR bytecode associated with each GPU program is stored in the jogArray that is the result of each jog.foreach( ) call. In a decisional step 340, evaluation of each GPU device (lambda) function is deferred until the device data representing the result of the GPU programs is explicitly requested to be transferred to the host (as in statement 3 of the example of Table 1, above).

When the result of the GPU programs is explicitly requested to be transferred to the host, the tree containing all the jog.foreach( ) calls and all their jogArray arguments is traversed backwards from the result in a step 350. Then, in a step 360, the intermediate IR code associated with the Java lambda functions are collected and composed into aggregate IR code for further processing. Those skilled in the pertinent art will see that IR bytecode that lie outside the path so traversed are not inserted into the aggregate IR code and is therefore never executed.

Such further processing typically includes employing a library (e.g., libNVVM commercially available from Nvidia Corporation) to optimize and process the IR into GPU executable code. In one embodiment, the GPU executable code is Parallel Thread Execution (PTX) code. Those skilled in the pertinent art are familiar with other embodiments of GPU executable code. The GPU executable code may then be executed in the GPU and the resulting data transferred back to the host (e.g., the CPU memory 112 of FIG. 1).

In some embodiments of the method 300, the further processing (by which the aggregate IR becomes GPU executable code) often involves two additional steps: (1) global function driver construction and (2) argument commoning. Since all the GPU programs are programs, a global function is typically constructed to serve as a driver to invoke the GPU programs in the correct order. Argument commoning is typically performed to ensure that the same jogArray that appears in multiple programs get the same name consistently. The method 300 ends in an end step 370.

In certain embodiments of the system and method described herein, the IR code stored in the jogArray is retained even after it has been involved in a lazy evaluation (and launched on the GPU). This is to facilitate any potential future invocations involving the same IR code. If the same jogArray is involved in another jog.foreach( ) call featuring a different GPU program, its IR will be replaced accordingly.

The simple JoG source code example set forth in Table 4, below clearly illustrates the potential applicability of the novel system and method introduced herein:

TABLE 4

Simple JoG Source Code Example

```
jB = jog.foreach( jA, lambda_add1);
jC = jog.foreach ( jB, lambda_sub1);
jC.toHost( );
```

In conventional processing, the above bytecode performs two GPU device launches (along with all the requisite data transfers between the host 110 of FIG. 1 and the device 120 of FIG. 1), with both programs performing an arithmetic operation on all the elements of the input array. With the novel system and method introduced herein, only one GPU program is launched; that GPU program performs no arithmetic operations, only a simply copy of elements from jog.Array jA to jog.array jC.

Those skilled in the art to which this application relates will appreciate that other and further additions, deletions, substitutions and modifications may be made to the described embodiments.

What is claimed is:

1. A system for optimizing multiple invocations of a graphics processing unit (GPU) program in Java, comprising:
   a host central processing unit (CPU) in said system which:
      compiles Java bytecode associated with a class object that implements a functional interface into Intermediate Representation (IR) code;
      stores said IR code with associated jogArray; and
      when a result of said GPU program is explicitly requested to be transferred to said host CPU, said host CPU traverses a tree containing said multiple invocations to collect said IR code and composes said IR code collected in said traversing into aggregate IR code.

2. The system as recited in claim 1 wherein said host processor constructs a global function to serve as a driver to invoke said GPU programs in a correct order.

3. The system as recited in claim 1 wherein said host processor performs argument commoning.

4. The system as recited in claim 1 wherein said host processor employs a library to optimize and process said IR code into GPU executable code.

5. The system as recited in claim 4 wherein said library is a libNVVM library.

6. The system as recited in claim 4 wherein a Java Virtual Machine (JVM) executing in said host launches execution of said GPU executable code in said GPU and transfers resulting data back to said host.

7. The system as recited in claim 1 wherein said multiple invocations are associated with jog.foreach ( ) calls.

8. The system as recited in claim 1 wherein said host processor further retains said IR code with said jogArray after said composing.

9. The system as recited in claim 1 wherein said host processor further conveys in subsequent processing whether or not a particular jog.Array associated with said GPU program is used as a temporary array.

10. The system as recited in claim 1 wherein said IR code collected in said traversing consists only of IR code necessary to produce said result.

11. A method of optimizing multiple invocations of a graphics processing unit (GPU) program in Java, comprising:
   compiling Java bytecode associated with a class object that implements a functional interface into Intermediate Representation (IR) code;
   storing said IR code with a jogArray;
   when a result of said GPU program is explicitly requested to be transferred to a host, traversing a tree containing said multiple invocations from said result to collect said IR code and composing said IR code collected in said traversing into aggregate IR code.

12. The method as recited in claim 11 further comprising constructing a global function to serve as a driver to invoke said GPU programs in a correct order.

13. The method as recited in claim 11 further comprising performing argument commoning.

14. The method as recited in claim 11 further comprising employing a library to optimize and process said IR code into GPU executable code.

15. The method as recited in claim 14 wherein said library is a libNVVM library.

16. The method as recited in claim 14 further comprising:
   executing said GPU executable code in said GPU; and
   transferring resulting data back to said host.

17. The method as recited in claim 11 wherein said multiple invocations are associated with jog.foreach ( ) calls.

18. The method as recited in claim 11 further comprising retaining said IR code with said jogArray after said composing.

19. The method as recited in claim 11 further comprising conveying in subsequent processing whether or not a particular jog.Array associated with said GPU program is used as a temporary array.

20. The method as recited in claim 11 wherein said IR code collected in said traversing consists only of IR code necessary to produce said result.

* * * * *